(12) United States Patent
Sowa

(10) Patent No.: US 12,385,871 B2
(45) Date of Patent: Aug. 12, 2025

(54) REFERENCE ELECTRODE FOR ELECTROCHEMICAL MEASUREMENT

(71) Applicant: Murata Manufacturing Co., Ltd., Nagaokakyo (JP)

(72) Inventor: Keisei Sowa, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 349 days.

(21) Appl. No.: 18/073,603

(22) Filed: Dec. 2, 2022

(65) Prior Publication Data

US 2023/0100101 A1    Mar. 30, 2023

Related U.S. Application Data

(63) Continuation of application No. PCT/JP2021/002370, filed on Jan. 25, 2021.

(30) Foreign Application Priority Data

Jun. 18, 2020 (JP) .................. 2020-105379

(51) Int. Cl.
*G01N 27/30* (2006.01)
*G01N 27/333* (2006.01)

(52) U.S. Cl.
CPC ....... *G01N 27/301* (2013.01); *G01N 27/3335* (2013.01)

(58) Field of Classification Search
CPC .......................... G01N 27/301; G01N 27/3335
See application file for complete search history.

(56) References Cited

U.S. PATENT DOCUMENTS

| | | | |
|---|---|---|---|
| 5,308,468 A | * | 5/1994 | Katoh .................. G01N 27/403 204/418 |
| 5,505,836 A | | 4/1996 | Miyahara et al. |
| 2019/0049400 A1 | | 2/2019 | Barton-Sweeney et al. |
| 2020/0116664 A1 | | 4/2020 | Abeyrathne et al. |

FOREIGN PATENT DOCUMENTS

| | | |
|---|---|---|
| JP | 0384449 A | 4/1991 |
| JP | 03172751 A | 7/1991 |
| JP | 03246459 A | 11/1991 |
| JP | 0419554 A | 1/1992 |

(Continued)

OTHER PUBLICATIONS

Lewenstam et al., "Solid contact reference electrode with a PVC-based composite electroactive element fabricated by 3D printing," Electrochemistry Communications 109 (2019) 106613 (Year: 2019).*

(Continued)

*Primary Examiner* — Alexander S Noguerola
(74) *Attorney, Agent, or Firm* — Keating & Bennett, LLP

(57) ABSTRACT

A reference electrode for electrochemical measurement includes a substrate, an electrode portion on the substrate, and an ion-sensitive film covering the electrode portion and including an inorganic salt and an organic substance. The electrode portion and the inorganic salt include an anion of the same element. In a top view of the electrode portion, the maximum shortest distance from any point in the electrode portion to the outer perimeter of the electrode portion is about 0.3 mm or less.

7 Claims, 7 Drawing Sheets

(56) References Cited

FOREIGN PATENT DOCUMENTS

| | | | |
|---|---|---|---|
| JP | 07128279 A | 5/1995 | |
| JP | 08327584 A | 12/1996 | |
| JP | 2018523837 A | 8/2018 | |
| TW | 1426642 B * | 2/2014 | ............. H01M 4/00 |

OTHER PUBLICATIONS

Taiwanese Intellectual Property Office machine translation of Zhou et al. TW I426642 B , patent published Feb. 11, 2014 (Year: 2014).*
International Search Report in PCT/JP2021/002370, mailed Apr. 6, 2021, 3 pages.
Written Opinion in PCT/JP2021/002370, mailed Apr. 6, 2021, 3 pages.

* cited by examiner

REFERENCE ELECTRODE FOR ELECTROCHEMICAL MEASUREMENT

CROSS REFERENCE TO RELATED APPLICATIONS

This application claims the benefit of priority to Japanese Patent Application No. 2020-105379, filed on Jun. 18, 2020 and is a Continuation Application of PCT Application No. PCT/JP2021/002370, filed on Jan. 25, 2021. The entire contents of each application are hereby incorporated herein by reference.

BACKGROUND OF THE INVENTION

1. Field of the Invention

The present invention relates to a reference electrode for electrochemical measurement.

2. Description of the Related Art

A typical electrochemical ion sensor includes a reference electrode including an internal solution. A reference electrode is an electrode that always has a constant potential even when the composition of a sample liquid to be measured changes. A reference electrode is accommodated in a support tube including an internal solution and an internal electrode made of glass.

For an electrode including an internal solution, the through-hole at the tip of a support tube is filled with a porous inorganic material or porous organic material, or a liquid junction from which the internal solution flows out is formed by using a glass sleeve, so that contact between a sample liquid and the internal solution is made to keep electrical connection.

Such an electrode including an internal solution requires a container with a certain volume or more because it uses a liquid and, if the volume of the liquid is reduced, has an issue of performance degradation caused by solvent evaporation. Such an electrode including an internal solution also has an issue of high costs because of difficulty in automated production due to complicated production process.

To solve these issues, several electrodes with no internal solution have been proposed (Japanese Unexamined Patent Application Publication No. 8-327584, Japanese Unexamined Patent Application Publication No. 7-128279, Japanese Unexamined Patent Application Publication No. 3-084449 and Japanese Unexamined Patent Application Publication (Translation of PCT Application) No. 2018-523837).

The technique disclosed in Japanese Unexamined Patent Application Publication No. 8-327584 uses a metal electrode, a redox layer, and an organic film.

The technique disclosed in Japanese Unexamined Patent Application Publication No. 7-128279 uses an electrode, a hydrophilic polymer layer, and an organic film.

The technique disclosed in Japanese Unexamined Patent Application Publication No. 3-084449 uses an electrode, a gel member layer, and an organic film. The technique disclosed in Japanese Unexamined Patent Application Publication (Translation of PCT Application) No. 2018-523837 uses a metal electrode and a nanocomposite including a metal compound.

For these electrodes, the time until a predetermined voltage is reached after the electrodes are brought into contact with and then electrically connected to a liquid to be measured (the time until electrical connection is established) is long, and it takes time to measure.

SUMMARY OF THE INVENTION

Preferred embodiments of the present invention provide reference electrodes for electrochemical measurement that are each able to shorten the time until electrical connection of the electrode is established.

A reference electrode for electrochemical measurement according to a preferred embodiment of the present invention includes a substrate, an electrode portion on the substrate, and an ion-sensitive film covering the electrode portion and including an inorganic salt and an organic substance. The electrode portion and the inorganic salt include an anion of the same element, and in the top view of the electrode portion, the maximum shortest distance from any point in the electrode portion to an outer perimeter of the electrode portion is about 0.3 mm or less.

Preferred embodiment of the present invention can provide a reference electrode for electrochemical measurement that can shorten the time until electrical connection of the electrode is established.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A reference electrode for electrochemical measurement according to preferred embodiments of the present invention will be described below with reference to the drawings.

However, the present invention is not limited to the following configurations and can be appropriately modified and applied without departing from the spirit of the present invention. A combination of two or more preferred embodiments described below is also within the present invention.

Figure 1:
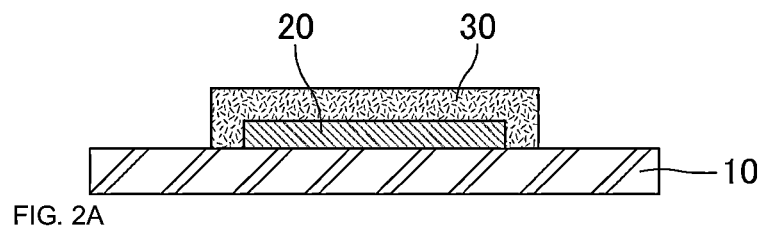
FIG. 1 is a schematic cross-sectional view of an example structure of a reference electrode for electrochemical measurement according to a preferred embodiment of the present invention.

FIG. 1 is a schematic cross-sectional view of an example structure of a reference electrode for electrochemical measurement according to a preferred embodiment of the present invention.

A reference electrode 1 for electrochemical measurement illustrated in FIG. 1 includes a substrate 10, an electrode portion 20 on the substrate 10, and an ion-sensitive film 30 covering the electrode portion 20.

A reference electrode for electrochemical measurement is an electrode used for a sheet-shaped electrochemical ion sensor and used in combination with a working electrode. A working electrode is an electrode whose potential changes with the ion concentration in a solution, and a reference electrode is an electrode that has a constant potential regardless of the ion concentration in the solution. The ion concentration in the solution can be determined by measuring a potential difference between the reference electrode and the working electrode.

As the substrate 10, a substrate that has been used as a substrate of a reference electrode for electrochemical measurement can be used, and for example, a glass substrate, a resin substrate, and a ceramic substrate can be used. The substrate 10 is preferably a substrate having resistance to the liquid properties (e.g., pH) of a solution targeted for electrochemical measurement. Examples of the resin in the case of using a resin substrate include PDMS (dimethylpolysiloxane), PET (polyethylene terephthalate), PP (polypropylene), PE (polyethylene), PC (polycarbonate), and PVC (polyvinyl chloride).

The electrode portion 20 preferably includes a metal. The metal in the electrode portion is, for example, at least one selected from the group consisting of gold, mercury, platinum, silver, nickel, calcium, palladium, and copper. The electrode portion may be an alloy oxide electrode, such as ITO, or may be a conductive polymer electrode, such as polyaniline.

The electrode portion 20 includes a metal salt. The metal salt includes an anion of the same element as the inorganic salt included in the ion-sensitive film.

Examples of the metal salt included in the electrode portion include chloride salts, iodide salts, sulfate salts. Specific examples include mercury chloride, silver chloride, silver iodide, copper sulfate, and mercury sulfate.

A combination of a metal and a metal salt included in the electrode portion is preferably, for example, a combination of silver and silver chloride, that is, preferably a silver-silver chloride electrode. A combination of, for example, mercury and mercurous chloride is also preferred.

The ion-sensitive film 30 includes an inorganic salt and an organic substance. The inorganic salt includes an anion of the same element as the metal salt included in the electrode portion.

Examples of the inorganic salt include sodium chloride and potassium chloride. These are examples where the metal salt included in the electrode portion is a chloride salt. These chloride salts are suitable as an inorganic salt when the electrode portion is a silver-silver chloride electrode. Other inorganic salts may be used.

The amount of inorganic salt in the ion-sensitive film is not limited and is preferably an amount sufficient for the electrode to function as a reference electrode. A sufficient amount of inorganic salt can be added to the ion-sensitive film by using a saturated solution of the inorganic salt during production.

Examples of the organic substance in the ion-sensitive film 30 include a PVB (polyvinyl butyral) resin, a PVC (polyvinyl chloride) resin, a polyvinyl bromide resin, and a polyvinylidene chloride resin.

FIGS. 2A to 2E are views schematically illustrating how electrical connection of the reference electrode is established after a liquid to be measured is brought into contact with the reference electrode.

Figure 2A:
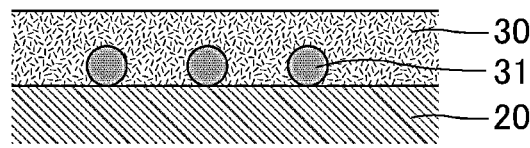
FIGS. 2A to 2E are views schematically illustrating how electrical connection of the reference electrode is established after a liquid to be measured is brought into contact with the reference electrode.
Figure 2B:
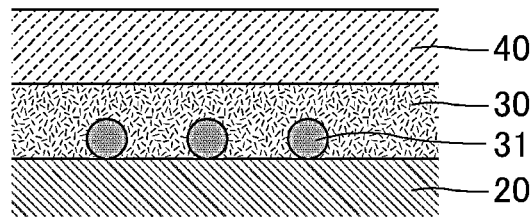

FIG. 2A illustrates an electrode portion 20, an ion-sensitive film 30 covering the electrode portion 20, and an inorganic salt 31 included in the ion-sensitive film 30. FIG. 2B illustrates how the ion-sensitive film 30 is in contact with a liquid 40 to be measured.

Figure 2C:
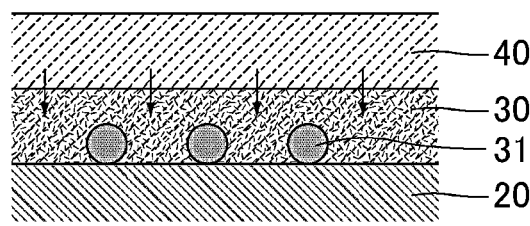

When the ion-sensitive film 30 is in contact with the liquid 40 to be measured, the liquid 40 in contact with the ion-sensitive film 30 permeates the ion-sensitive film 30 as illustrated in FIG. 2C.

Figure 2D:
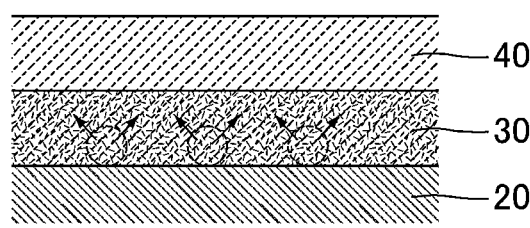
Figure 2E:
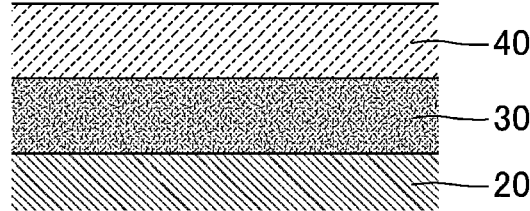

The inorganic salt 31 included in the ion-sensitive film 30 is then dissolved in the permeating liquid 40 as illustrated in FIG. 2D.

The inorganic salt 31 is then dissolved in the liquid 40 and diffused in the ion-sensitive film 30. When the concentration of cation and anion in the inorganic salt 31 reaches equilibrium in the ion-sensitive film, the potential becomes stable (see FIG. 2E). A stable potential is regarded as established electrical connection of the reference electrode.

Figure 3:
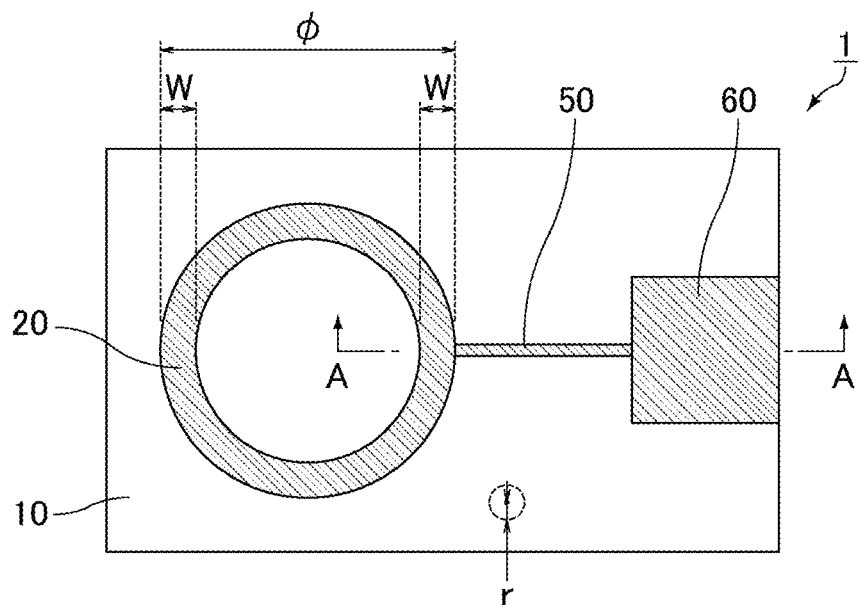
FIG. 3 is a schematic top view of one example of a reference electrode for electrochemical measurement according to a preferred embodiment of the present invention.
Figure 4:
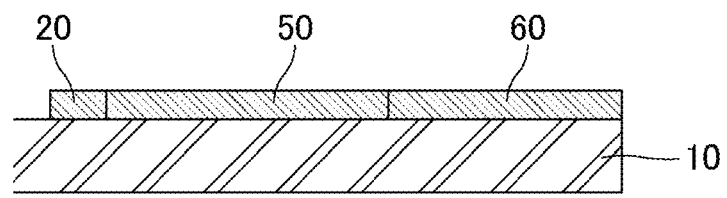
FIG. 4 is a cross-sectional view taken along line A-A of the reference electrode for electrochemical measurement illustrated in FIG. 3.

FIG. 3 is a schematic top view of one example of the reference electrode for electrochemical measurement. FIG. 4 is a cross-sectional view taken along line A-A of the reference electrode for electrochemical measurement illustrated in FIG. 3.

A reference electrode 1 for electrochemical measurement illustrated in FIG. 3 and FIG. 4 includes an electrode portion 20, a wiring portion 50, and a conduction portion 60 on a substrate 10.

The electrode portion 20 is provided with an ion-sensitive film in the same form as in FIG. 1, but the ion-sensitive film is not illustrated. FIG. 3 illustrates the shape of the electrode portion 20 in top view.

The electrode portion 20, the wiring portion 50, and the conduction portion 60 are all conductors and conductive patterns having particular shapes by a patterning method, such as, for example, sputtering using a stencil mask, inkjet printing, gravure printing, offset printing, or screen printing.

The electrode portion 20 has a circular or substantially circular ring shape in top view.

An insulating material is attached to the surface of the wiring portion 50 to insulate the surface.

The conduction portion 60 is a portion to be connected to a conducting wire to be connected to a device (voltmeter) for measuring a potential difference.

In the top view of the electrode portion of the reference electrode for electrochemical measurement of the present preferred embodiment, the maximum shortest distance from any point in the electrode portion to the outer perimeter of the electrode portion is preferably about 0.3 mm or less, for example.

The advantageous effect of this feature will be described with reference to FIG. 5.

Figure 5:
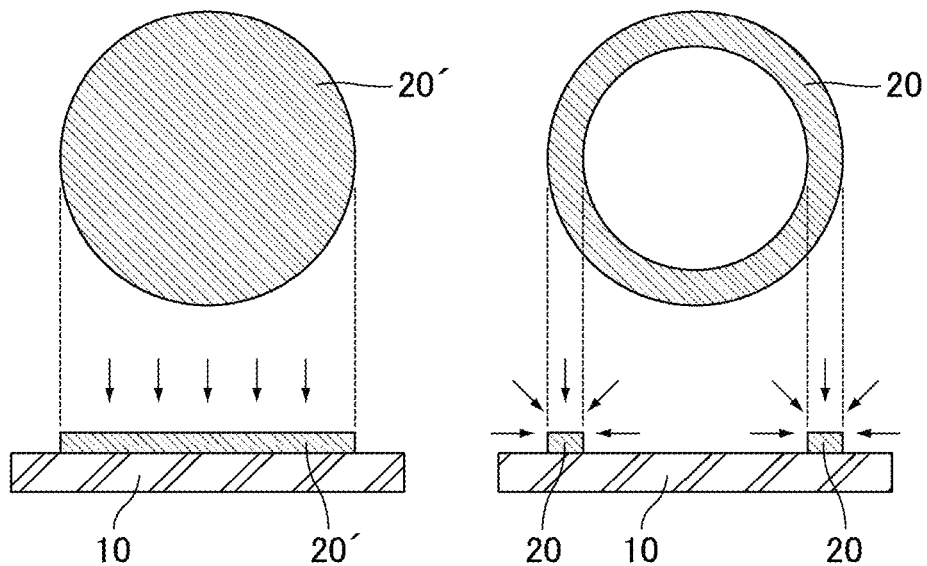
FIG. 5 is a schematic view illustrating a difference in material diffusion between an electrode portion with a disk shape and an electrode portion with a circular ring shape according to a preferred embodiment of the present invention.

FIG. 5 is a schematic view illustrating a difference in material diffusion between an electrode portion with a disk shape and an electrode portion with a circular ring shape.

FIG. 5 illustrates an electrode portion 20' with a disk shape on the left side and an electrode portion 20 with a circular or substantially circular ring shape on the right side, and illustrates the shape in top view on the upper side and the shape in cross sectional view on the lower side. In this example, the electrode portion with a disk shape is assumed to have the same diameter as the circle at the outer perimeter of the electrode portion with a circular or substantially circular ring shape.

For the electrode portion 20' with a disk shape as illustrated on the left side in FIG. 5, material supply is provided through linear diffusion, which is material diffusion in the direction perpendicular or substantially perpendicular to the electrode. The material supply is indicated by arrows in the direction perpendicular or substantially perpendicular to the electrode.

The electrode portion 20 with a circular or substantially circular ring shape as illustrated on the right side in FIG. 5 has a relatively narrow electrode width as compared to the electrode portion 20'. As the electrode width narrows, material supply is provided through spherical diffusion including not only material diffusion in the direction perpendicular or substantially perpendicular to the electrode and but also material diffusion in side directions. The diffusion rate can be regarded as the flow rate of the material across the target cross section per unit time. Linear diffusion in the direction perpendicular or substantially perpendicular to the electrode limits the amount of material diffusion. Spherical diffusion dramatically increases the amount of material diffusion. Spherical diffusion thus accelerates diffusion of the solution into the ion-sensitive film and the electrode surface and shortens the electrical connection time.

A shortened electrical connection time means that the physical properties of a solution to be measured can be measured for a short time. To measure the pH, the reference electrode for electrochemical measurement can be used simply like litmus paper, unlike pH meters requiring calibration for each measurement.

The use of the reference electrode for electrochemical measurement of the present preferred embodiment shortens the time that elapses until the ion concentration in the solution can be measured after storage in a dry state. Thus, the reference electrode for electrochemical measurement can be used in applications for measuring the sweat composition by contact with a living body. The application fields include medical care, health care, in-vehicle applications, experience-type games, and environmental and process control. Examples of in-vehicle applications include alcohol detection by analysis of the composition of sweat from the hand gripping a steering wheel. Examples of applications of environmental and process control include detection of various components in soil, water and sewage, industrial effluents, industrial water, and production lines.

After completion of electrical connection, the potential of the electrode is affected by the material concentration near the electrode. For example, when a silver-silver chloride electrode is used as an electrode portion, the chloride ion concentration determines the potential of the electrode. Since the chloride ion concentration near the electrode is affected by permeation of the solution into the ion-sensitive film, uneven and slow solution diffusion leads to potential instability (drift).

In an electrode with a disk shape showing relatively large solution diffusion, the diffusion behavior of the solution differs between a central portion of the electrode and a circumferential portion of the electrode, which causes drift. A narrow electrode width causes uniform and rapid spherical diffusion at any portion of the electrode and can significantly prevent or reduce drift.

In the top view of the electrode portion of the reference electrode for electrochemical measurement of the present invention, the maximum shortest distance from any point in the electrode portion to the outer perimeter of the electrode portion is preferably about 0.3 mm or less, for example. Whether this requirement is satisfied is checked by placing a circle with a radius of about 0.3 mm (diameter: about 0.6 mm) on the electrode portion and confirming that a portion of the circle protrudes from the electrode portion regardless of the position of the center of the circle on the electrode portion.

In FIG. 3, the circle with a radius r=about 0.3 mm is indicated by a dotted line.

When the outer perimeter of the circle coincides with the outer perimeter of the electrode portion, the circle is considered to protrude from the electrode portion.

For the electrode portion having a circular or substantially circular ring shape in the top view as illustrated in FIG. 3, the maximum shortest distance from any point in the electrode portion to the outer perimeter of the electrode portion is about 0.3 mm or less as long as the circular ring has a width (size indicated by double arrow W in FIG. 3) of about 0.6 mm or less.

The diameter Ø of the outer perimeter of the circular or substantially circular ring of the electrode portion is not limited.

The thickness of the electrode portion in the reference electrode for electrochemical measurement of the present invention is assumed to be smaller than the width of the electrode portion. Specifically, the thickness of the electrode portion is less than about 0.6 mm, for example.

When the electrode portion is thick, the effect of diffusion from the side surfaces of the electrode portion is relatively large. When the thickness of the electrode portion is smaller than the width of the electrode portion, the diffusion behavior of the solution is substantially determined by the shape of the electrode portion in top view regardless of the thickness of the electrode portion.

The shape of the electrode portion in top view is considered to be the shape of only the electrode portion in top view without taking the thickness of the ion-sensitive film into consideration.

The thickness of the ion-sensitive film is not specifically limited, but is preferably, for example, about 25 μm or more and about 400 μm or less.

The electrode portion preferably, for example, has a projected area of about 70650 μm² or more in top view.

A small projected area of the electrode portion in top view means large spherical diffusion, which is preferred because it leads to a short electrical connection time. However, if the area is too small, the amount of anion included in the electrode portion is so small that the anion is dissolved in the ion-sensitive film or the anion disappears from the surface of the electrode portion because of slight oxidation-reduction on the surface of the electrode portion. The disappearance of the anion from the surface of the electrode portion may cause drift. To ensure the minimum electrode area, the electrode portion preferably, for example, has a projected area of about 70650 μm² or more in top view.

The shape of the electrode portion in top view is not limited to the circular ring shape illustrated in FIG. 3, and may be another shape. FIG. 6, FIG. 7, FIG. 8, FIG. 9, FIG. 10, and FIG. 11 are schematic top views of other examples of the reference electrode for electrochemical measurement.

Figure 6:
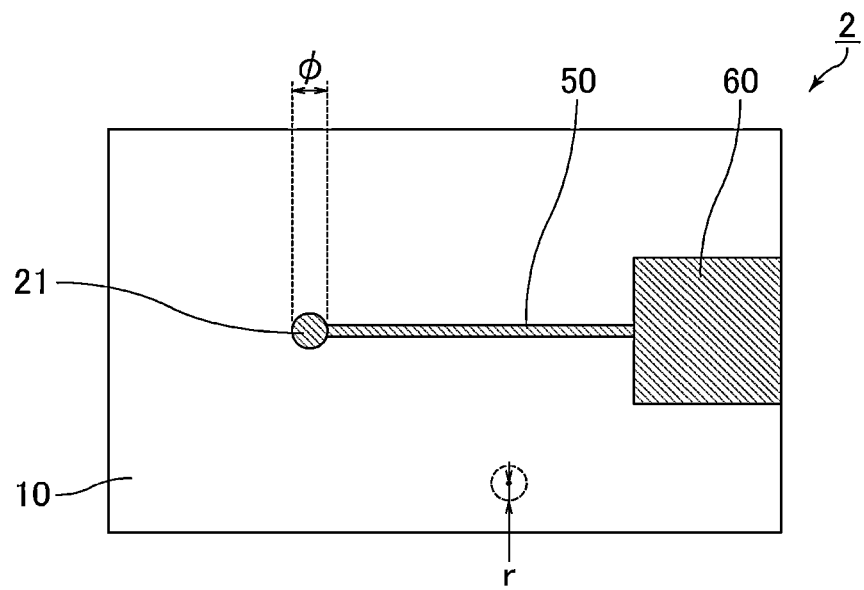
FIG. 6 is a schematic top view of another example of a reference electrode for electrochemical measurement according to a preferred embodiment of the present invention.

FIG. 6 illustrates a reference electrode 2 for electrochemical measurement including an electrode portion 21 with a disk shape. The electrode portion 21, which has a disk shape, is preferably small in size and has a diameter Ø of, for example, about 0.6 mm or less (radius: about 0.3 mm or less). For such a small electrode portion, the maximum shortest distance from any point in the electrode portion to the outer perimeter of the electrode portion is, for example, about 0.3 mm or less in the top view of the electrode portion. This configuration provides the advantageous effects of the reference electrode for electrochemical measurement of the present preferred embodiment.

Figure 7:
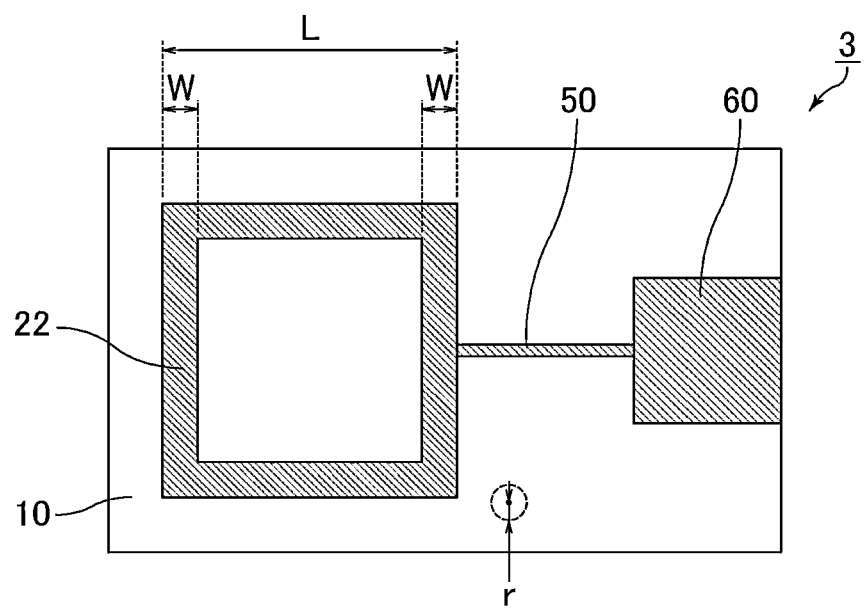
FIG. 7 is a schematic top view of another example of a reference electrode for electrochemical measurement according to a preferred embodiment of the present invention.

FIG. 7 illustrates a reference electrode 3 for electrochemical measurement including an electrode portion 22 with a quadrangular ring shape. The electrode portion 22 is a quadrangular ring with a width W, for example, of about 0.6 mm or less. The inner perimeter and outer perimeter of the quadrangular ring are both square or substantially square. The length L of one side of the outer perimeter of the square is not limited.

The quadrangular ring is not limited to square or substantially square and may be any other quadrangles, such as rectangle, or may be any other polygons, such as triangle and pentagon.

Figure 8:
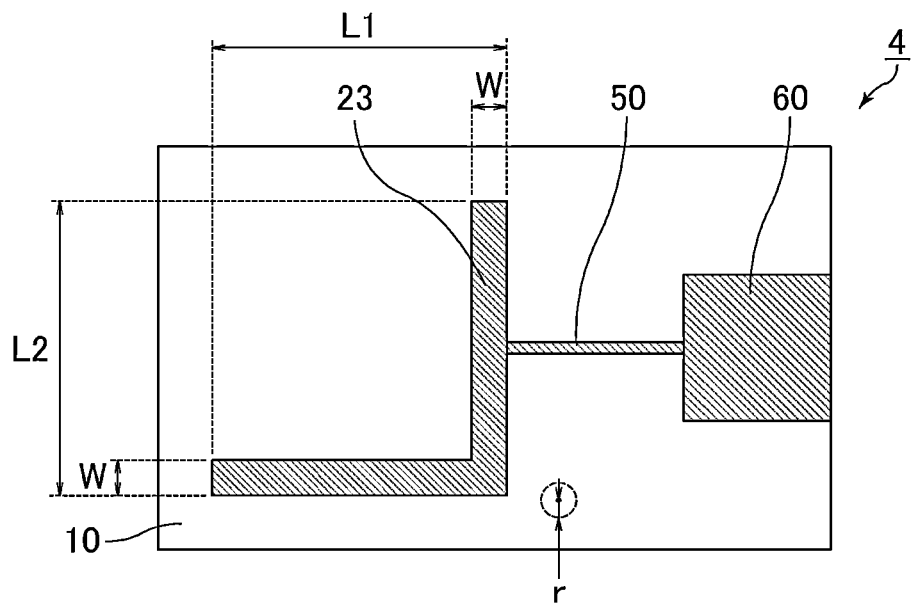
FIG. 8 is a schematic top view of another example of a reference electrode for electrochemical measurement according to a preferred embodiment of the present invention.

FIG. 8 illustrates a reference electrode 4 for electrochemical measurement having an electrode portion 23 with an L-shape. The electrode portion 23 has a shape obtained by leaving only two sides of the square of the electrode portion with a quadrangular ring shape illustrated in FIG. 7. The electrode portion has a width W of, for example, about 0.6 mm or less. The length L1 and length L2 of the sides of the L-shape are not limited.

Figure 9:
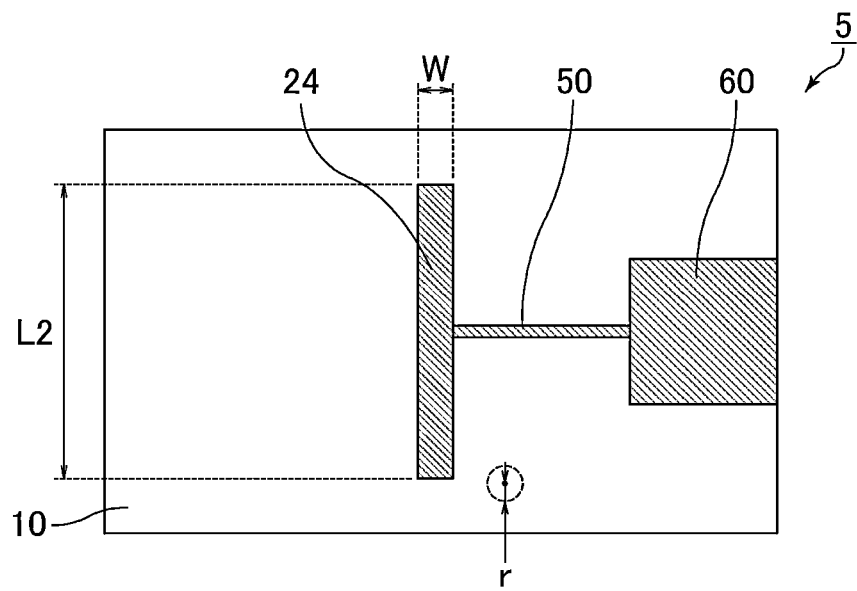
FIG. 9 is a schematic top view of another example of a reference electrode for electrochemical measurement according to a preferred embodiment of the present invention.

FIG. 9 illustrates a reference electrode 5 for electrochemical measurement including an electrode portion 24 with a linear shape. The electrode portion 24 has a shape obtained by leaving only one side of the square of the electrode portion with a quadrangular ring shape illustrated in FIG. 7. The electrode portion has a width W of, for example, about 0.6 mm or less. The length L2 of one side of the linear shape is not limited.

Figure 10:
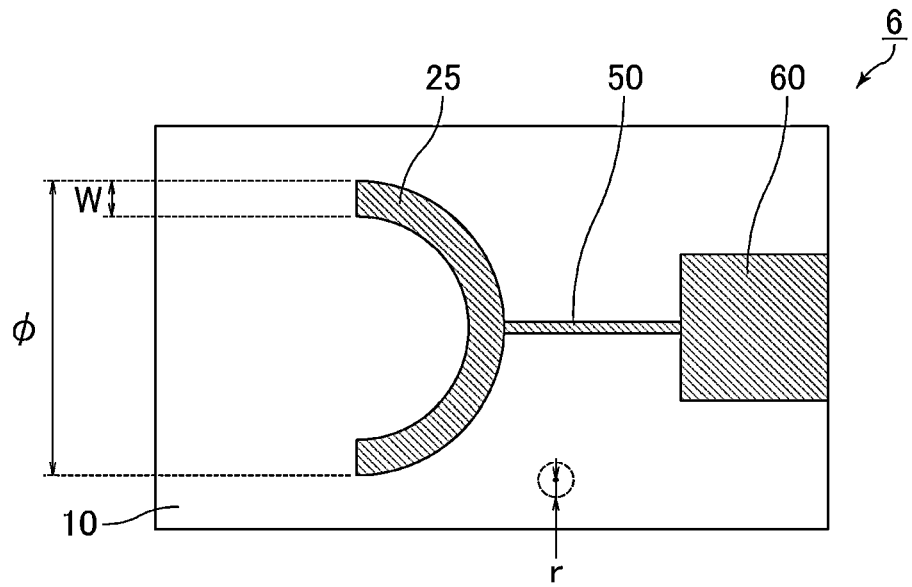
FIG. 10 is a schematic top view of another example of a reference electrode for electrochemical measurement according to a preferred embodiment of the present invention.

FIG. 10 illustrates a reference electrode 6 for electrochemical measurement including an electrode portion 25 with an arc shape. The electrode portion 25 has a shape obtained by leaving only a half of the electrode portion with a circular ring shape illustrated in FIG. 3. The electrode portion has a width W of, for example, about 0.6 mm or less. The diameter Ø of the outer perimeter of the arc is not limited.

In this case, the arc is a semicircular or substantially semicircular arc, but the arc is not limited to a semicircular arc and may be other arcs, such as a third circular arc or a quarter circular arc.

Figure 11:
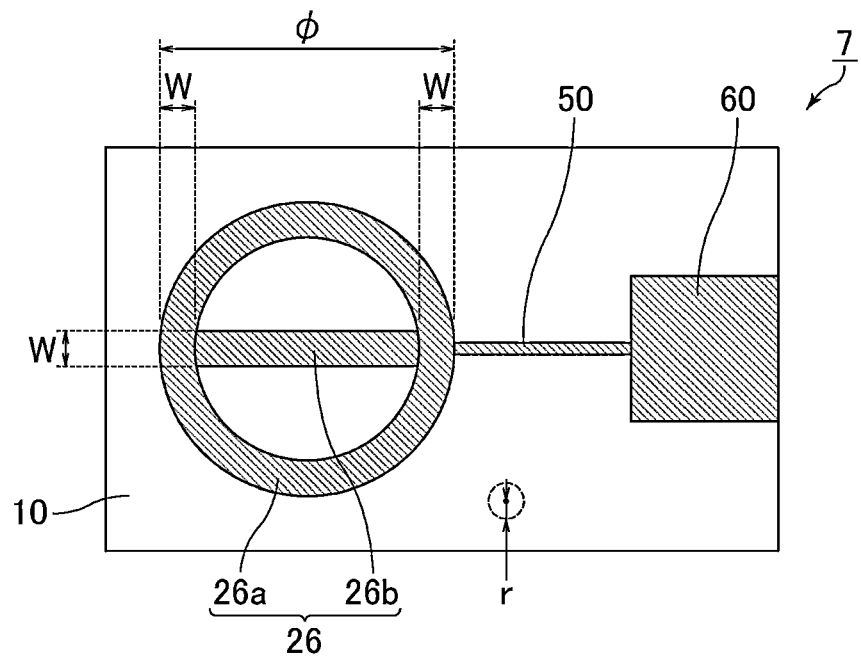
FIG. 11 is a schematic top view of another example of a reference electrode for electrochemical measurement according to a preferred embodiment of the present invention.

FIG. 11 illustrates a reference electrode 7 for electrochemical measurement including an electrode portion 26 including a combination of an electrode portion 26a with a circular ring shape and an electrode portion 26b with a linear shape extending in the diameter direction of the circular ring. The electrode portion 26 has a shape obtained by placing an electrode portion with a linear shape in the electrode portion with a circular ring shape illustrated in FIG. 3. The electrode portion has a width W of, for example, about 0.6 mm or less. The diameter Ø of the outer perimeter of the circular ring is not limited.

When the electrode portion has a width of about 0.6 mm in this configuration, there may be only a few points that do not satisfy the requirement of "the maximum shortest distance to the outer perimeter of the electrode portion is about 0.3 mm or less" near points where the electrode portion 26a is in contact with the electrode portion 26b. When there are only a few such exceptional points if present, the requirement of "the maximum shortest distance from any point in the electrode portion to the outer perimeter of the electrode portion is about 0.3 mm or less in the top view of the electrode portion" is considered to be satisfied.

EXAMPLES

Examples, which more specifically disclose the present invention, will be described below. The present invention is not limited only to these Examples.

Example 1

Referring to FIG. 1, a reference electrode for electrochemical measurement was produced by forming an electrode portion 20 made of a silver/silver chloride electrode on a substrate 10 composed of a PET film and covering the electrode portion with an ion-sensitive film 30 including NaCl as an inorganic salt.

The electrode portion 20 was formed by depositing a silver conductor with a circular ring shape in top view as illustrated in FIG. 3 by sputtering. A 0.1 mol/L $FeCl_3$ solution was brought into contact with the conductor for 1 min to form silver chloride on the conductor. The electrode portion 20 composed of a silver/silver chloride electrode was formed by the above procedure. The width (W) of the electrode portion, which was the width of the circular ring, was about 0.6 mm, and the outer diameter (Ø) of the circular ring was about 9.0 mm.

Furthermore, a 10% PVB methanol solution saturated with NaCl as an inorganic salt was applied onto the electrode portion 20 and dried to form the ion-sensitive film 30.

The methanol solution was used in an amount of 3 μL per mm² of the area of the electrode portion. The thickness of the formed ion-sensitive film was about 200 μm.

The thickness of the ion-sensitive film was measured by using an X-ray CT system (SMX-225 FPD HR available from Shimadzu Corporation). The measurement conditions were a tube voltage of about 115 kV, a tube current of about 70 μA, and an observation magnification of about 50 times.

A wiring portion 50 and a conduction portion 60 were provided by forming a conductive pattern made of silver by sputtering when forming the electrode portion 20. A Kapton tape (product number CISV-1215 available from Nikkan Industries Co., Ltd.) was attached to the wiring portion to completely insulate the wiring portion.

A reference electrode for electrochemical measurement was produced by the above process.

The electrode portion and a liquid junction of a commercially available saturated calomel electrode (available from BAS Inc.) were immersed in a solution (for example, about 1 mM NaCl solution) to be measured, and a potential difference between the conduction portion and a conduction portion of the commercially available saturated calomel electrode was electrochemically evaluated (ALS 2325 available from BAS Inc., measured by potentiometry).

The commercially available saturated calomel electrode is an electrode used as a reference electrode and has a stable potential. Thus, a potential between the commercially available saturated calomel electrode and the reference electrode for electrochemical measurement produced in Example 1 should be stabilized at a constant value as long as electrical connection is established between the reference electrode for electrochemical measurement produced in Example 1 and the solution to be measured.

In electrochemical measurement using the reference electrode for electrochemical measurement produced in Example 1, the electrical connection time is as short as 3 seconds, and a constant potential is obtained with almost no drift.

The electrical connection time is defined as the time that elapses until the absolute value of the amount of potential change per unit time becomes less than about 100 mV/min when the potential fluctuations are measured after the electrode portion is immersed in the solution to be measured, provided that the dry state is at time zero.

If the electrical connection time is not adequate, potential fluctuations of several volts occur.

Drift was about 0.1 mV/min as determined by calculating the slope in the range of measurement time from about 1800 seconds to about 2400 seconds.

Examples 2 to 4, Comparative Examples 1 to 4

Reference electrodes for electrochemical measurement were produced in the same or substantially the same manner except that the shape of each electrode portion was changed by changing the width (W) of each electrode portion. Electrochemical measurement was performed by using the reference electrodes for electrochemical measurement of Examples and Comparative Examples.

The evaluation results of Examples 1 to 4 and Comparative Examples 1 to 4 are summarized in Table 1.

TABLE 1

| | Width of Electrode Portion | Electrical Connection Time | Drift |
|---|---|---|---|
| Example 1 | 0.6 mm | 3 sec | 0.1 mV/min |
| Example 2 | 0.5 mm | 3 sec | 0.1 mV/min |
| Example 3 | 0.4 mm | 4 sec | 0.1 mV/min |
| Example 4 | 0.3 mm | 3 sec | 0.1 mV/min |
| Comparative Example 1 | 1.0 mm | 6 min 30 sec | 17 mV/min |
| Comparative Example 2 | 0.9 mm | 6 min | 17 mV/min |
| Comparative Example 3 | 0.8 mm | 6 min 30 sec | 17 mV/min |
| Comparative Example 4 | 0.7 mm | 6 min | 17 mV/min |

Examples 5 to 8, Comparative Examples 5 and 6

The shape of the electrode portion produced in Example 1 was changed to a disk shape in top view as illustrated in FIG. 6. Each reference electrode for electrochemical measurement was produced by changing the diameter (Ø) of the electrode portion, which was the diameter of the disk. Electrochemical measurement was performed by using the reference electrodes for electrochemical measurement of Examples and Comparative Examples.

The evaluation results of Examples 5 to 8 and Comparative Examples 5 and 6 are summarized in Table 2.

TABLE 2

| | Width of Electrode Portion | Electrical Connection Time | Drift |
|---|---|---|---|
| Example 5 | 0.6 mm | 3 sec | 0.1 mV/min |
| Example 6 | 0.5 mm | 5 sec | 0.1 mV/min |
| Example 7 | 0.4 mm | 4 sec | 0.1 mV/min |
| Example 8 | 0.3 mm | 3 sec | 0.1 mV/min |
| Comparative Example 5 | 9.0 mm | 18 min | 30 mV/min |
| Comparative Example 6 | 0.7 mm | 6 min | 17 mV/min |

Examples 9 to 12, Comparative Example 7

The shape of the electrode portion produced in Example 1 was changed to a quadrangular ring shape in top view as illustrated in FIG. 7. The length (L) of one side of the outer perimeter of the quadrangular ring was about 9.0 mm.

Each reference electrode for electrochemical measurement was produced by changing the width (W) of the electrode portion, which was the width of the quadrangular ring. Electrochemical measurement was performed by using the reference electrodes for electrochemical measurement of Examples and Comparative Examples.

The evaluation results of Examples 9 to 12 and Comparative Example 7 are summarized in Table 3.

TABLE 3

| | Width of Electrode Portion | Electrical Connection Time | Drift |
|---|---|---|---|
| Example 9 | 0.6 mm | 3 sec | 0.1 mV/min |
| Example 10 | 0.5 mm | 3 sec | 0.1 mV/min |
| Example 11 | 0.4 mm | 5 sec | 0.1 mV/min |
| Example 12 | 0.3 mm | 4 sec | 0.1 mV/min |
| Comparative Example 7 | 0.7 mm | 9 min | 17 mV/min |

Examples 13 to 16, Comparative Example 8

The shape of the electrode portion produced in Example 1 was changed to an L-shape in top view as illustrated in FIG. 8. The lengths (L1 and L2) of the sides of the L-shape were both about 9.0 mm.

Each reference electrode for electrochemical measurement was produced by changing the width (W) of the electrode portion. Electrochemical measurement was performed by using the reference electrodes for electrochemical measurement of Examples and Comparative Examples.

The evaluation results of Examples 13 to 16 and Comparative Example 8 are summarized in Table 4.

TABLE 4

| | Width of Electrode Portion | Electrical Connection Time | Drift |
|---|---|---|---|
| Example 13 | 0.6 mm | 4 sec | 0.1 mV/min |
| Example 14 | 0.5 mm | 3 sec | 0.1 mV/min |
| Example 15 | 0.4 mm | 4 sec | 0.1 mV/min |
| Example 16 | 0.3 mm | 5 sec | 0.1 mV/min |
| Comparative Example 8 | 0.7 mm | 8 min | 17 mV/min |

Examples 17 to 20, Comparative Example 9

The shape of the electrode portion produced in Example 1 was changed to a linear shape in top view as illustrated in FIG. 9. The length (L2) of one side of the linear shape was about 9.0 mm.

Each reference electrode for electrochemical measurement was produced by changing the width (W) of the electrode portion. Electrochemical measurement was performed by using the reference electrodes for electrochemical measurement of Examples and Comparative Examples.

The evaluation results of Examples 17 to 20 and Comparative Example 9 are summarized in Table 5.

TABLE 5

| | Width of Electrode Portion | Electrical Connection Time | Drift |
|---|---|---|---|
| Example 17 | 0.6 mm | 4 sec | 0.1 mV/min |
| Example 18 | 0.5 mm | 3 sec | 0.1 mV/min |
| Example 19 | 0.4 mm | 5 sec | 0.1 mV/min |
| Example 20 | 0.3 mm | 4 sec | 0.1 mV/min |
| Comparative Example 9 | 0.7 mm | 10 min | 17 mV/min |

Examples 21 to 24, Comparative Example 10

The shape of the electrode portion produced in Example 1 was changed to an arc shape in top view as illustrated in FIG. 10. The diameter (Ø) of the arc was about 9.0 mm.

Each reference electrode for electrochemical measurement was produced by changing the width (W) of the electrode portion. Electrochemical measurement was performed by using the reference electrodes for electrochemical measurement of Examples and Comparative Examples.

The evaluation results of Examples 21 to 24 and Comparative Example 10 are summarized in Table 6.

TABLE 6

| | Width of Electrode Portion | Electrical Connection Time | Drift |
|---|---|---|---|
| Example 21 | 0.6 mm | 4 sec | 0.1 mV/min |
| Example 22 | 0.5 mm | 5 sec | 0.1 mV/min |
| Example 23 | 0.4 mm | 4 sec | 0.1 mV/min |
| Example 24 | 0.3 mm | 4 sec | 0.1 mV/min |
| Comparative Example 10 | 0.7 mm | 11 min | 17 mV/min |

Figure 12:
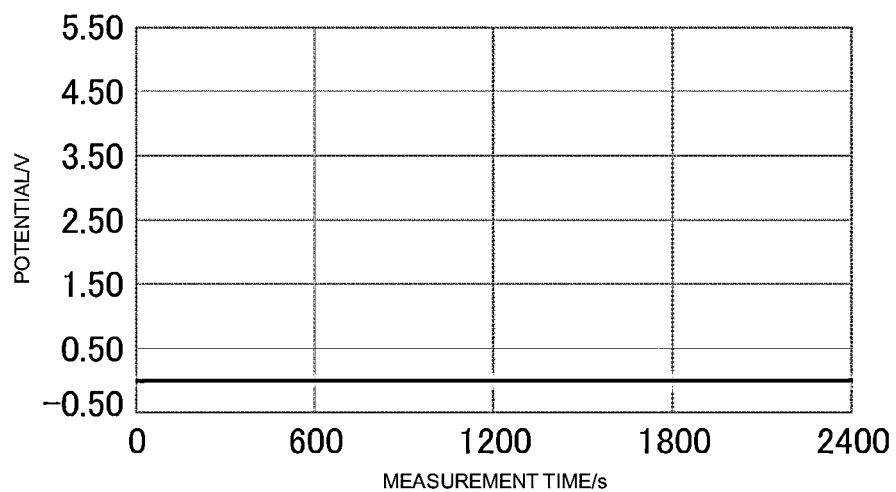
FIG. 12 is a graph illustrating the results of electrochemical measurement in Example 1.
Figure 13:
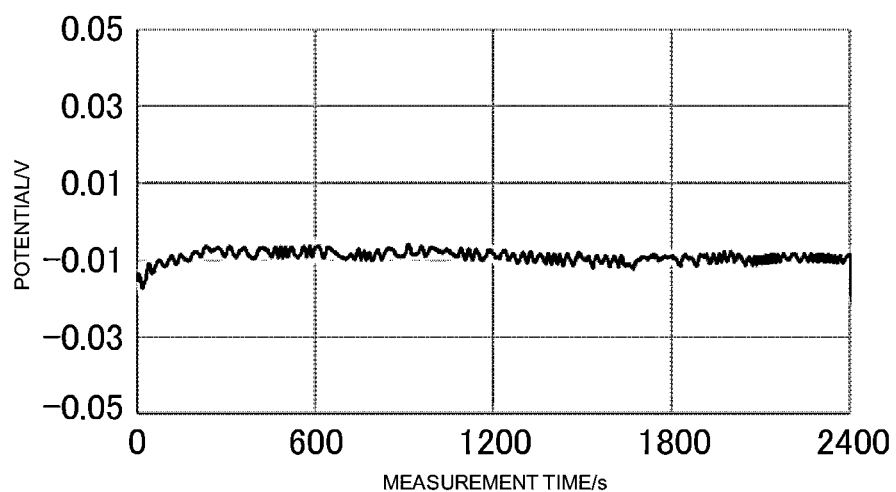
FIG. 13 is an enlarged view of FIG. 12.

FIG. 12 is a graph illustrating the results of electrochemical measurement in Example 1. FIG. 13 is an enlarged view of FIG. 12.

Figure 14:
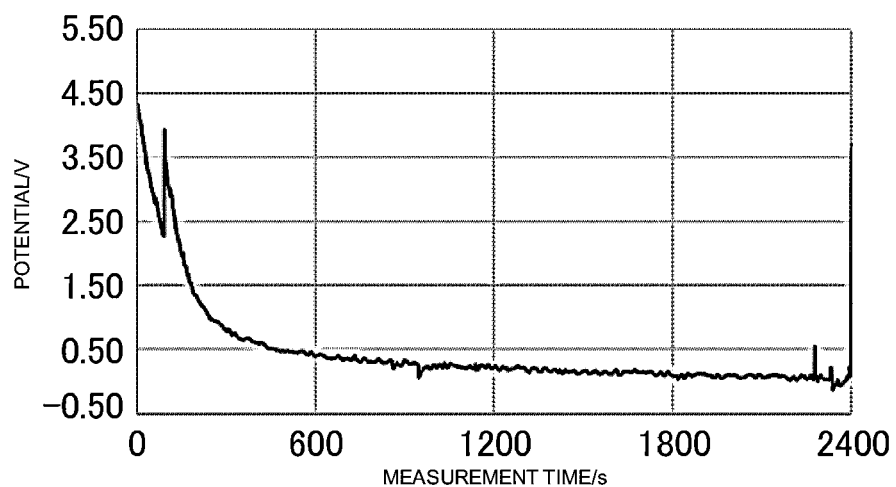
FIG. 14 is a graph illustrating the results of electrochemical measurement in Comparative Example 1.
Figure 15:
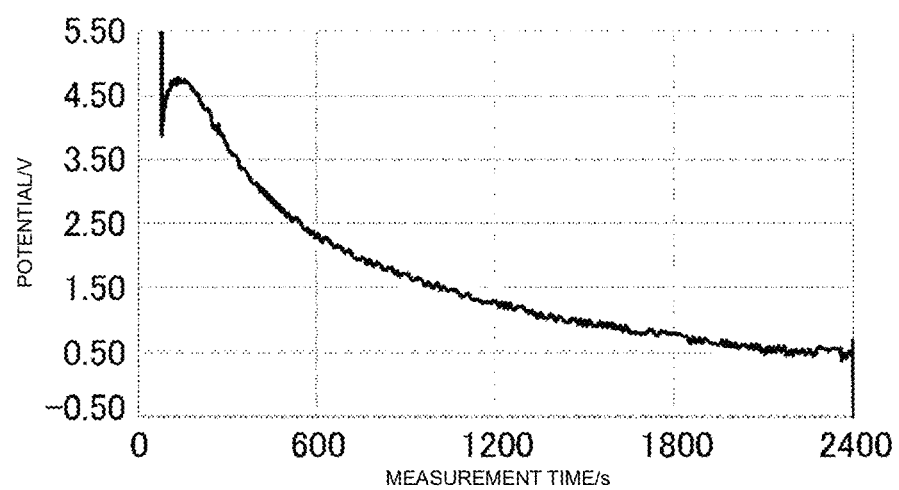
FIG. 15 is a graph illustrating the results of electrochemical measurement in Comparative Example 5.

FIG. 14 is a graph illustrating the results of electrochemical measurement in Comparative Example 1. FIG. 15 is a graph illustrating the results of electrochemical measurement in Comparative Example 5.

Referring to FIG. 13, the potential reaches a substantially constant level within a short time after start of measurement in Example 1. This means that the electrical connection time is short.

Referring to FIG. 14 and FIG. 15, the potential does not stabilize until a long time has elapsed after start of measurement in Comparative Example 1 and Comparative Example 5. This means that the electrical connection time is long.

The results in Table 1 to Table 6 indicate that a short electrical connection time and small drift are observed when the width or diameter of the electrode portion is about 0.6 mm or less.

If the width or diameter of the electrode portion is more than about 0.6 mm, the electrical connection time is long, and the drift is large.

When the width or diameter of the electrode portion is about 0.6 mm or less, the maximum shortest distance from any point in the electrode portion to the outer perimeter of the electrode portion in the top view of the electrode portion is about 0.3 mm or less. In this case, spherical diffusion occurs when the reference electrode comes into contact with a solution to be measured, and spherical diffusion accelerates diffusion of the solution into the ion-sensitive film and the electrode surface and shortens the electrical connection time.

Example 8 is an example where the diameter of the electrode portion with a disk shape is as small as about 0.3 mm. In this example, the level of drift is small.

Examples 25 to 28

Each reference electrode for electrochemical measurement was produced in the same manner as in Example 1 except that the thickness of the ion-sensitive film was changed by changing the coating amount of the PVB methanol solution for forming the ion-sensitive film. Electrochemical measurement was performed by using the reference electrodes for electrochemical measurement of Examples.

The evaluation results of Examples 25 to 28 together with the evaluation result of Example 1 are summarized in Table 7.

TABLE 7

| | Thickness of Organic Film | Electrical Connection Time | Drift |
|---|---|---|---|
| Example 1 | 200 μm | 3 sec | 0.1 mV/min |
| Example 25 | 400 μm | 4 sec | 0.1 mV/min |
| Example 26 | 100 μm | 3 sec | 0.1 mV/min |
| Example 27 | 50 μm | 5 sec | 0.1 mV/min |
| Example 28 | 25 μm | 2 sec | 0.1 mV/min |

Table 7 indicates that, even when the thickness of the ion-sensitive film is changed, the electrical connection time is short, and the drift is small. This shows that, when the width or diameter of the electrode portion is about 0.6 mm or less, a short electrical connection time and small drift are observed regardless of the thickness of the ion-sensitive film.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A reference electrode for electrochemical measurement, the reference electrode comprising:
   a substrate;
   an electrode portion on the substrate; and
   an ion-sensitive film covering the electrode portion and including an inorganic salt and an organic substance; wherein
   the electrode portion and the inorganic salt include an anion of a same element; and
   in a top view of the electrode portion, a maximum shortest distance from any point in the electrode portion to an outer perimeter of the electrode portion is about 0.3 mm or less.

2. The reference electrode for electrochemical measurement according to claim 1, wherein the electrode portion has a projected area of about 70650 $\mu m^2$ or more in the top view.

3. The reference electrode for electrochemical measurement according to claim 1, wherein the electrode portion has a circular or substantially circular ring shape, a quadrangular or substantially quadrangular ring shape, a disk shape, an arc shape, an L-shape, or a linear shape in the top view.

4. The reference electrode for electrochemical measurement according to claim 1, wherein the electrode portion includes a metal and a metal salt.

5. The reference electrode for electrochemical measurement according to claim 1, further comprising:
   a wiring portion connected to the electrode portion; and
   a conduction portion connected to the wiring portion; wherein
   the wiring portion and the conduction portion are on a surface of the substrate.

6. The reference electrode for electrochemical measurement according to claim 5, wherein an insulating material is on a surface of the wiring portion.

7. The reference electrode for electrochemical measurement according to claim 1, wherein a thickness of the ion-sensitive film is about 25 $\mu m$ or more and about 400 $\mu m$ or less.

* * * * *